Nov. 17, 1931. W. J. WIGNALL 1,831,898
FLUID COMMODITY DISPENSING APPARATUS
Filed March 5, 1929 4 Sheets-Sheet 3
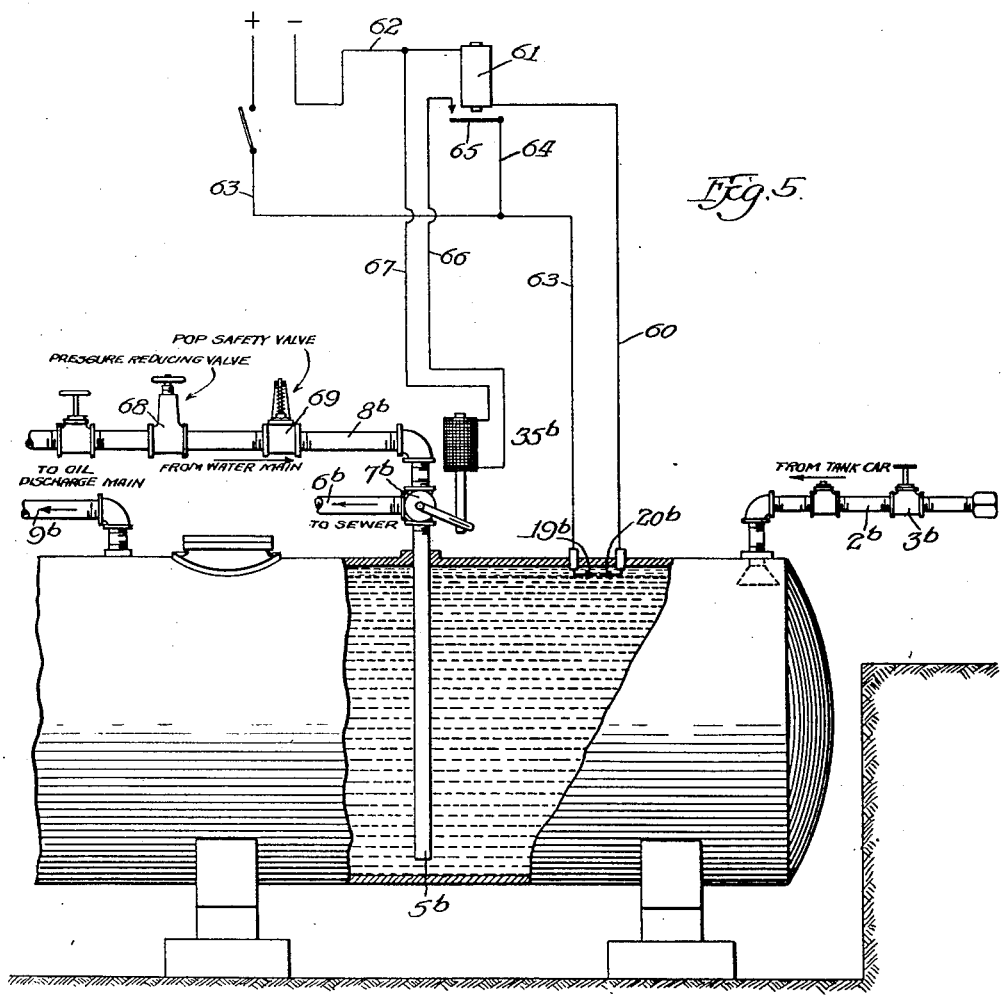

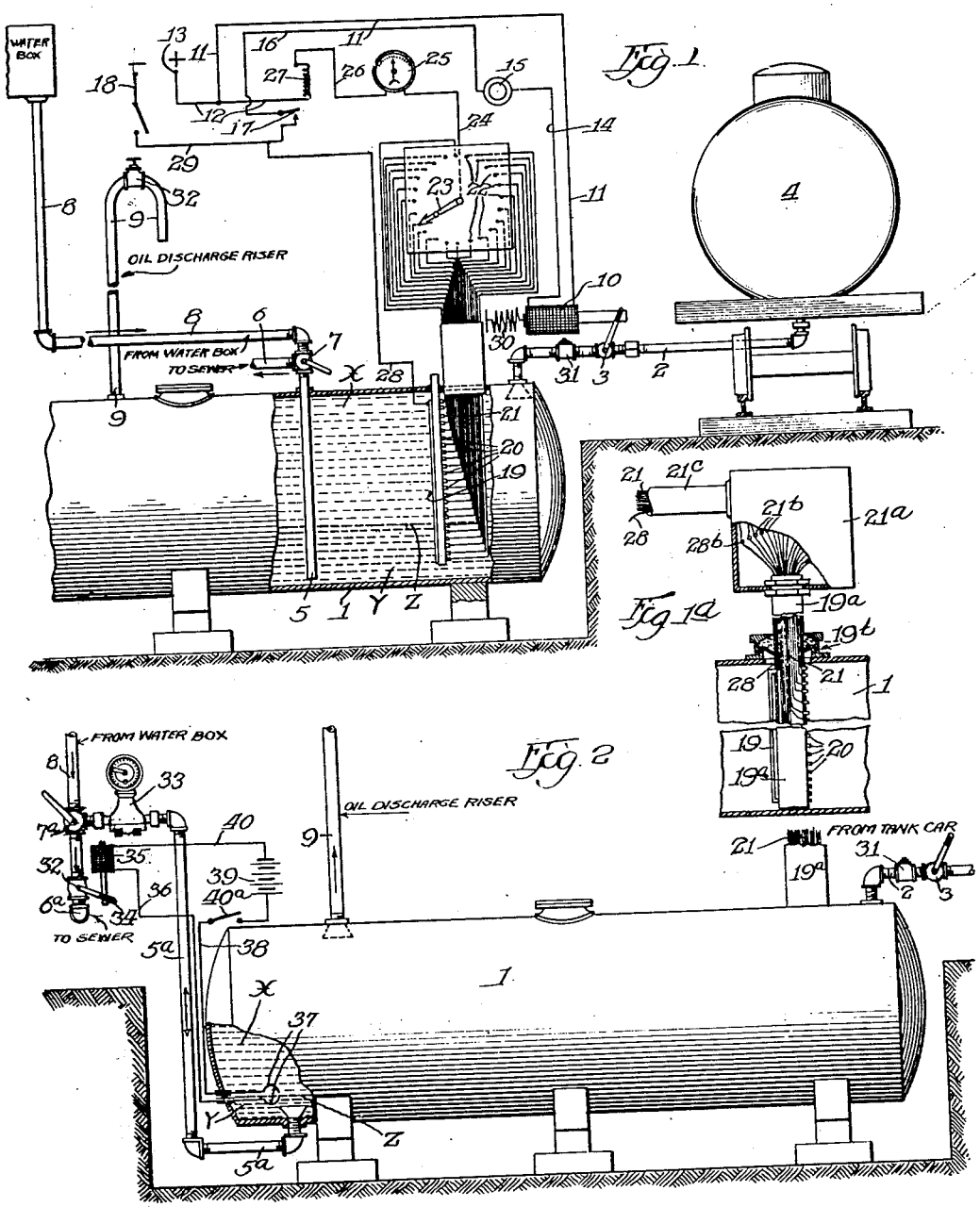

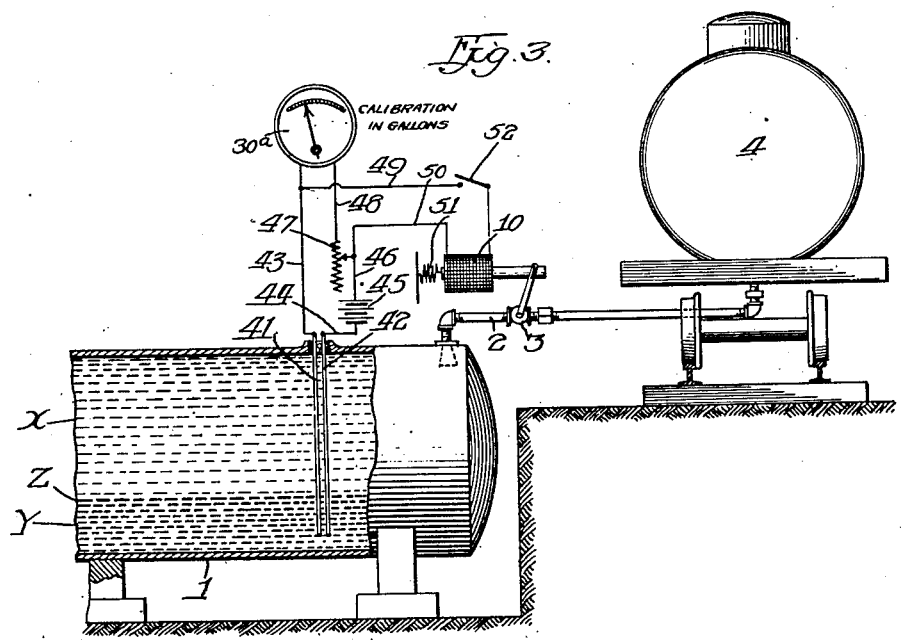
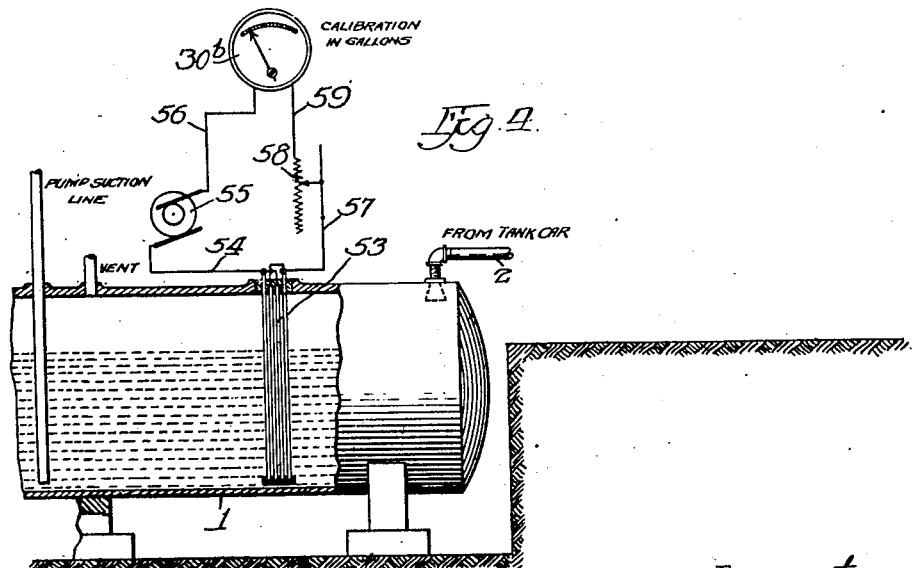

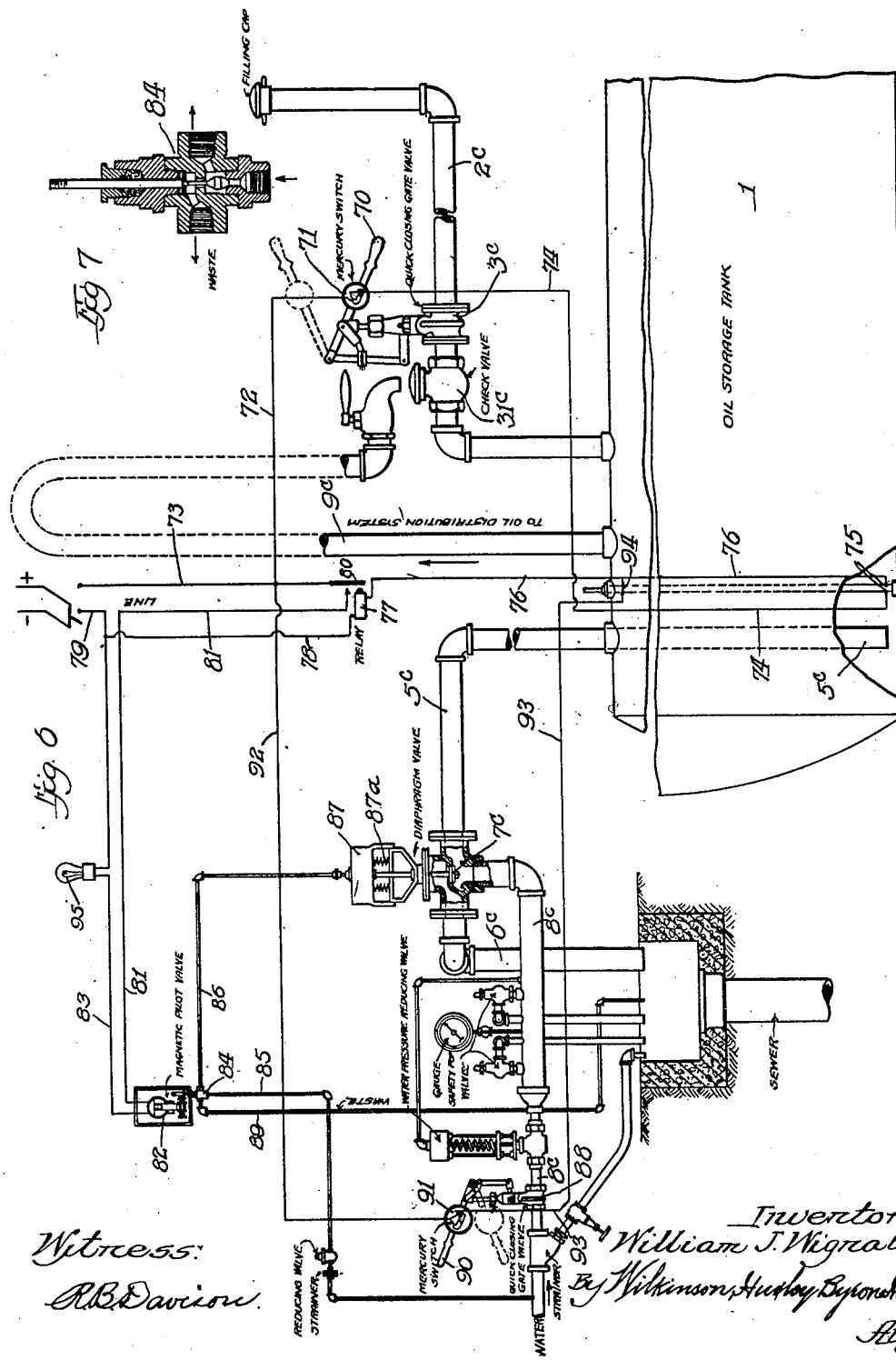

Patented Nov. 17, 1931

1,831,898

UNITED STATES PATENT OFFICE

WILLIAM J. WIGNALL, OF CHICAGO, ILLINOIS, ASSIGNOR TO RAILWAY HYDRAULIC SYSTEMS, OF CHICAGO, ILLINOIS, A CORPORATION OF ILLINOIS

FLUID COMMODITY DISPENSING APPARATUS

Application filed March 5, 1929. Serial No. 344,306.

This invention relates to storing and dispensing apparatus for fluids, and particularly to a storing and dispensing apparatus in which the fluid that is to be stored and dispensed (and which will be herein referred to as "the commodity fluid") is displaced from the storage space by means of another fluid (which will be herein referred to as "the displacing fluid") that is sufficiently different in characteristics from the commodity fluid to render the two fluids substantially immiscible and to cause them to remain practically separated in a plane which will be referred to herein as their common level. In such apparatus, the common level of the two fluids, of course, rises as the commodity fluid is dispensed; and when the supply of commodity fluid is substantially exhausted, it is usually replenished by opening up a suitable escape for the displacing fluid and permitting the commodity fluid to flow in under a superior pressure and force the displacing fluid out before it until a sufficient quantity of commodity fluid has entered the dispensing tank, when the apparatus is ready to repeat the process of dispensing the commodity fluid as the same may be required.

Ordinarily, the commodity and the dispensing fluids in a system of the kind described, will be found to have different inherent degrees of electrical conductivity or resistance to the flow of current through the liquid, and this difference I have found to be of such an order as will admit of indicating the presence of one or the other of the two liquids at predetermined stages or levels in the storage tank. The primary object of the invention is to take advantage of this difference in electrical conductivity or resistance to electrical flow for the purpose of indicating the proportions of the two liquids in the tank, in order that an operator may have proper information to enable him to operate the system, or use the difference in electrical conductivity or resistance to bring about automatic control of the respective fluids, or to perform both the indicating and the automatic control functions, as may be desired. In recharging the tank, the replenishing inflow of the commodity fluid through the supply pipe, or outflow of displacing fluid through its waste pipe, or flow through both of said pipes, will be arrested before any of the commodity fluid can in dispensing commodity from the tank escape through the waste pipe; and similarly, escape of commodity through the dispensing pipe and inflow of displacing fluid through its supply pipe, or both of said flows, will be interrupted before any of the displacing fluid can escape through the dispensing pipe. The fluid controlled electric circuits may be employed either as a pilot force for a control which is exerted by hydraulic or other force, or for both the piloting and the completing forces of the control.

Another object of the invention is to provide a rational arrangement of instrumentalities whereby the aforesaid primary object may be realized to advantage in the practical application of the system.

In the accompanying drawings, which disclose the preferred embodiment of means for realizing the several objects of the invention—

Figure 1 is a view partly structural and partly schematic, showing the application of the principle of the invention to a storage apparatus adapted to indicate changing stages of the common level of the two fluids in the storage tank, one of which has a greater coefficient of electrical conductivity than the other, and in which is also embodied an electrically actuated cut-off for the commodity replenishing valve, which valve is deenergized by the attainment of a predetermined state of the common level of the fluids in the storage space.

Figure 1a is a detail view showing the preferred method of providing a plurality of submerged and exposed circuit terminals within the tank.

Figure 2 is a view illustrating the application of the invention to a safety valve, and adapted to shut off the waste pipe, past which the displacing fluid escapes when retiring from the storage space to permit inflow of a replenishing volume of the commodity fluid.

Figure 3 is a view showing a construction which produces the same general results as those accomplished by the arrangement of Figure 1, but which is modified to direct readings in units of measurement of the commodity fluid contained within the storage space.

Figure 4 is a view showing the use of terminals of the variable submerged area type acting on the condenser principle and permitting the use of alternating current in the indicator or other circuit which they control, the system being used in a single liquid tank.

Figure 5 is a view showing the application of the invention to the control of the displacing liquid inflow pipe and operating to shut off the waste valve upon attainment by the displacing liquid of its uppermost permissible stage.

Figure 6 is a view partly structural and partly schematic, showing the application of the invention to manually controlled valves in the commodity replenishing pipe and the displacing liquid inflow pipe, whereby through means of an application of the invention, reciprocal action will be enforced by said valves in a three-way control of the displacing fluid upon manual operation of either of said valves; and wherein the tank is provided with upper and lower limit terminals and the displacing liquid pipe is provided with a safety control that limits flow of displacing liquid inward or outward as the upper and lower permissible stages of the displacing liquid are attained in the storage space.

Figure 7 is a detail view of the pilot valve shown in Figure 6.

Referring to Figure 1, 1 represents a storage tank for receiving a supply of commodity fluid and dispensing the same in desired quantities at the will of an operator, said tank being adapted to be supplied with commodity fluid through means of a pipe 2, controlled by a valve 3, leading from any suitable major source of supply, such, for instance, as a tank car 4. Tank 1 is also provided with a displacing fluid pipe 5 terminating near the bottom of the tank and through which water or other suitable fluid flow into the tank 1 for the purpose of displacing the commodity fluid, or from said tank to a waste pipe 6 when it is desired to replenish the tank 1 with a new supply of commodity fluid. Pipe 5 has a valve 7 which is adapted to open communication at the will of an operator between the tank 1 and a waste pipe 6, or a pipe 8 that supplies water under pressure from some suitable source. Tank 1 is further provided with a dispensing pipe 9 through which commodity fluid may be delivered to any desired point, and through which the commodity fluid is caused to flow, by the manipulation of the valve 7, to proper position to admit water under pressure from the pipe 8.

X represents generally the commodity fluid in the tank 1, and Y the displacing fluid, which fluids, being of different specific gravities and immiscible one as to the other, remain separated in the plane represented generally by Z, herein referred to as the common level of the fluids, which level rises and falls according to the proportions of the two fluids that are in the tank.

With an apparatus as thus far described, it is practicable to manually open the valves 3 and 7 so that pressure water from pipe 8 will be cut off, a fresh supply of commodity fluid will flow in through pipe 2, and water will discharge in advance of the inflowing commodity fluid through the pipe 6 to sewer until the desired quantity of commodity fluid is present in the tank, when the valves may be reversed in position to close the pipe 3 and open pipe 8 to the tank. This operation is common to storage systems of the displacing water type, but serious difficulties are experienced in the operation of such systems, because of oversight as to the time of opening or closing the valves, with the result that commodity fluid may be permitted to go to waste and cause not only a loss of the fluid but an explosion hazard in the sewer; or displacing water may be admitted to a point beyond the permissible upper limit and until water passes out through the dispensing pipe 9, and is delivered in lieu of the commodity fluid.

The arrangement of Figure 1 affords one remedy for the objections above noted. It involves providing the replenishing valve 3 with controlling magnet 10 adapted to be energized, for instance, by wires 11 and 12 leading to the positive pole 13 of a current source, and by wire 14 through signal 15, wire 16, and relay armature 17 and by wire 29 to the negative side 18 of said source, so that in the event the three-way controlling valve 7 is left open to sewer too long, the commodity X will not reach the sewer because displacing fluid Y, which has a different electrical conductivity from that of the commodity fluid X, will retire below the submerged and exposed terminals 19 and 20 of certain circuits now to be described, and so modify the effect of the replenishing valve magnet 10 as to close valve 3 and arrest further inflow of commodity fluid from the replenishing source.

The circuits controlled by submerged exposed contacts 19 and 20, in the particular embodiment illustrated in Figure 1, are employed also for indicating purposes, and particularly with a multiple stage indicator for ascertainment of the approximate stage of the common level Z and consequent volume of commodity in the tank at any time. Hence, while the lowermost terminal 20 with a suitable coacting terminal 19 would serve to control the valve 3, a plurality of the terminals are employed on at least one side of the submerged circuit gap, arranged in vertical series, and corresponding in number to the fluid level stages that are to be indicated; each one of the terminals in the vertical series being connected by a separate wire, in the group of wires 21, to one of the contact points 22 arranged in annular series within reach of the circuit closing switch 23 that is connected by wire 24 through the indicator 25, wire 26, relay winding 27, and wire 12 with the positive pole 13 of the current source. The opposite side 19 of the submerged gap within the tank may consist of a continuous conductor having a vertical dimention substantially coextensive with the vertical series of terminals 20, and this is connected through wires 28 and 29 with the negative terminal 18 of the current source. By this arrangement, whenever the more conductive fluid in the tank, which will usually be the displacing fluid Y, envelops any portion of the continuous terminal 19 and any one of the vertical series of terminals 20, and the switch arm 23 is on a terminal 22 corresponding to the enveloped terminal 20, current will flow through the relay 27 that will close the circuit of magnet 10 through armature 17 of said relay and valve 3 will be held open. But when by the inflow of commodity fluid X, permitted by the opening of valve 7 to waste pipe 6, the common level Z is forced below the lowermost terminal 20, relay 17 will be opened, magnet 10 deenergized, and valve 3 will be closed by some suitable influence, such, for instance, as spring 30, so that further displacement of fluid Y will not take place and none of the fluid X will enter the pipe 5, through which it might otherwise be wasted.

Again, with the arrangement shown in Figure 1, the operator may by traversing the annular series of contacts 22 with the switch 23 moving, say, clockwise until the last contact 22 is reached which will show an effect on the indicator 25, the quantity of commodity still remaining in the tank can de deduced from the position of the switch arm. Also, by placing the switch arm 23 on the last contact 22 corresponding to the uppermost terminal 20, and leaving it there during the normal operation of the system in discharging the commodity, an indication will be given as soon as the supply of commodity approaches a predetermined limit, and the operator will then know that it is necessary to replenish the supply of commodity fluid. This he will do by opening three-way valve 7 to waste pipe 6 and voluntarily opening the replenishing valve 3 to the supply 4, unless valve 3 is rendered automatic in its action through means of the magnet 10, in which event the replenishing valve opens whenever any one of the submerged terminals 20 is enveloped by the displacing fluid Y, in which event it is merely necessary for the operator to open the three-way valve 7 to waste. But before doing this, the operator will shift the switch arm 23 from the last contact 22 to the first contact in the annular series which corresponds to the lowermost submerged terminal 20, so that valve 3 will be automatically closed again as soon as the replenishing liquid has flowed in sufficiently to carry the common level Z downward as far as the predetermined safety limit, whereupon the system is ready to resume the discharge operation by merely reopening the three-way valve 7 to the pressure supply pipe 8.

It is to be noted that during the interval between the attainment of the upper safety limit by the common level Z and the opening of the valve 7 to waste, the system will be subject to the superior pressure of the pipe 8; but this will not drive liquid backward through the supply pipe 2 into the replenishing supply 4 because of the check valve 31 located in the pipe 2; and since there will be nothing to continue backflow of fluid from the tank through waste pipe 6 when pressure pipe 8 is closed by valve 7, service pipe 9 being normally closed by controlling valve 32, and replenishing valve 3 being automatically shut off by the inflow of commodity fluid to the lower limit, valve 7 becomes the master valve in the operation of this particular embodiment of the invention, the fluid controlled circuits serving the purpose of providing upper and lower automatic controls for the replenishing valve 3, and testing of fluid level in the tank. In this connection it may also be noted that the plurality of submerged terminals 20 and corresponding contacts 22, while affording a wide range of fluid level indications, may also be relied on to selectively determine the upper and lower limits of fluid content; and that whereas the indicator 25 will show a flow of current whenever a terminal 20 is submerged by the conductive liquid Y, and the switch arm 23 is on the corresponding contact which includes a continuing indication when arm 23 is on the first contact corresponding to the lowermost terminal and the common level Z is anywhere above the lowermost terminal, signal 15 (which may be either visual or audible) will be active or inactive according to whether the valve magnet 10 is energized or deenergized and valve 3 is opened or closed.

As shown in Figure 1a, the terminals 19 and 20, with their connecting wires 21 and 28, are preferably introduced into the tank through means of a conduit tube 19a standing vertically in the tank and there secured by a suitable packing gland 19b, the terminals 19 and 20 protruding through and making water tight connection with walls of the conduit as shown, and the wires rising from these terminals within the conduit to an outlet box 21a mounted on the conduit and removable and replaceable with the conduit and within which are suitable binding posts 21b, 28b for connecting wires 21 and 28 contained within the cable 21c. Conduit 19a is preferably made mainly or wholly of bakelite or some other electrically non-conducting material capable of resisting water and hydrocarbon in which it may be submerged; and when any adjustments are to be made to terminals or circuits, it is simply necessary to release the packing gland 19b and move the entire unit from the tank.

As shown in Figure 2, tank 1 may likewise be provided with means for shutting off the escape of displacing fluid to the sewer under the incoming commodity, as soon as the commodity has expelled the displacing fluid sufficiently to bring the dividing plane Z down to a predetermined lower limit, and thereby prevent escape and waste of the commodity into the sewer. Here, the displacing fluid traverses a pipe 5a in entering the tank 1 to displace the commodity X through the dispensing pipe 9 when said pipe 9 is opened, and also in escaping from the tank 1 under the pressure of replenishing supply of the commodity, which is superior to the pressure of the displacing fluid, when pipe 5a is closed against the supply of displacing fluid, and opened to waste. In order that these phases of displacing water flow may be established at will, pipe 5a leads (preferably by way of a flow meter 33) to a three-way valve 7a which may be voluntarily opened to either the supply pipe 8 or waste pipe 6a; and in order to automatically arrest waste of the displacing fluid when the dividing plane or common level Z reaches the predetermined lower limit, a suitable valve closing the pipe 5a to the waste pipe (for instance, an extra valve 32, although it might be the valve 7a) is installed, and this valve is brought under control of a solenoid 35 connected through wire 36 with one of a pair of submerged electric terminals 37 located at the said lower limit, and of which the other terminal is connected by wire 38 to current source 39 from which wire 40 extends to the solenoid to complete the circuit. By this arrangement, when three-way valve 7a is opened to shut off the pipe 8 and open pipe 5a to waste pipe 6a, and the displacing fluid has flowed backward through pipe 5a and out to the sewer under the now superior pressure of the commodity supply entering through pipe 2, and the gap of the terminals 37 is no longer closed by the displacing fluid, magnet 35 will be deenergized, the controlling lever 34 will drop to the position shown in Figure 2, and the escape of displacing fluid Y, and consequently the inflow of replenishing commodity, will be arrested so that waste of the commodity cannot take place, and it now remains for the operator to voluntarily shift the three-way valve 7a to restore the system to dispensing condition in which automatic flow through the dispensing pipe 9 will occur whenever said pipe is voluntarily opened; a circuit opening switch 40a being also voluntarily opened to retire the automatic control 37 until the next time it becomes necessary to replenish the supply of commodity fluid.

The function of the flow meter 33 is to afford visible indication of the stage of the commodity in the tank, for instance, by zeroizing the flow meter when the tank is practically empty of commodity, permitting the flow meter to run backward under waste of the displacing fluid until the predetermined quantity of commodity has entered the tank, and then permitting the flow meter to register, by forward movement, the inflow of displacing liquid from time to time as commodity is dispensed. Under these conditions, flow meter 33, by its reading at any time, will indicate the quantity of commodity in the tank by deduction if the pointer is observed merely with reference to the limits of its movements, or by absolute registry in terms of units of fluid measurement, if appropriately calibrated for the purpose.

Figure 3 shows an arrangement whereby the supply of commodity within the tank may be indicated at all times by a galvanometer calibrated in units of fluid measurement and electrically constructed to make it responsive to changes in current flow resulting from degree of submergence of two vertically elongated circuit terminals, and in which automatic control of inflow of the replenishing supply of the commodity is also provided for. Thus, 41, 42 represent two vertically elongated circuit terminals submerged in the tank 1 and having sufficient vertical dimension to subject them to variation in the extent of their submergence, within limits appropriate to the indication to be made; these terminals being connected, respectively, through a wire 43 to one side of galvanometer 30a and by wire 44 to current source 45, wire 46, variable resistance 47, and wire 48 to the other side of the galvanometer 30a. With this arrangement, if the impedance of the circuit 30a, 43, 41, 42, 46, 47 and 48 can be properly determined by regulating its factor, such as inherent conductivity of displacing water Y, spacing of the terminals 41, 42, regulation of resistance 47, and electrical construction of galvanometer 30a, changes in the volume of current flow resulting from fluctuations in the quantity of displacing fluid Y will be responded to by the galvanometer in a manner to indicate the complementary volume of the commodity X by deduction, or, if the galvanometer be appropriately calibrated, by direct reading in terms of fluid measurement.

In order to shut off the inflow of commodity from the source 4 through the pipe 2 when the common level Z or plane of separation between the two fluids has reached a predetermined lower limit, the terminals 41 and 42 are ended short of the bottom of the tank 1 so that the gap between them is no longer closed by any portion of the more conductive displacing fluid Y, flow of current from terminals 41 through wire 43, shunt wire 49, solenoid 10 and shunt wire 50 will be interrupted, and valve 3 will be automatically closed by return of the core of the solenoid to normal position, for instance, under the influence of spring 51. Inasmuch as automatic shut off 10, 51 for the valve 3 will be useful only at the time of replenishing, whereas the galvanometer 30a may be desirable at any time, shunt circuit 49, 50 will be left under control of a switch 52 that may constitute the means normally employed for opening valve 3 so that inflow of replenishing supply can be started only by simultaneously setting the safety cut off.

According to Figure 4, the submerged circuit gap may be made up of a plurality of spaced terminals having substantial vertical dimension, for instance, as shown at 53, and by having these terminals connected alternately to the two poles of current source, for instance, by wire 54 connecting the first and third elongated terminals to the current source 55 from which leads a wire 56 to one side of galvanometer 30b, and wire 57, variable resistance 58, and wire 59 connecting the second and fourth elongated terminals with the other side of the galvanometer. A plurality of elongated terminals submerged to greater or less degree in a single liquid, or in that one of two liquids which has the greater conductivity, are particularly useful where an alternating current is used in the circuit of the terminals, as suggested by the conventional representation of A. C. current source at 55. A plurality of terminals such as shown at 53 operate with an effect simulating condenser effect. Also, the use of alternating current renders the terminals self cleansing with respect to the gases of electrolysis which are liable to accumulate upon them where direct current is used.

As also suggested in Figure 4, such an indicating device would be appropriate to a system in which the commodity alone is contained in the tank 1 and is pumped therefrom for dispensing purposes; the nature of the terminals 53 being such that they will be responsive to the relatively feeble current afforded by the low conductivity of the commodity, at least to a degree that will be sufficient to reflect the extent of submergence in a relatively delicate galvanometer.

Figure 5 shows a system in which commodity fluid is supplied by intake pipe 2b controlled by manual valve 3b. Automatic arrest of inflow of displacing water to dispense the commodity fluid, when the commodity fluid is exhausted, is brought about by acting directly upon the three-way valve 7b which controls communication between the displacing fluid pipe 5b on the one hand, and the supply pipe 8d and waste pipe 6b on the other hand; said valve 7b being for this purpose connected with solenoid magnet 35b which is brought under control of upper limit circuit terminals 19b, 20b, through means of pilot wire 60, relay 61, and wire 62 leading to one pole of the current source, wire 63 leading to the other pole of the current source, and power circuit including the valve operating solenoid 35b and consisting of wire 63 leading from one pole of the current source wire 64, armature 65 and wire 66 leading to one side of the solenoid 35b, and wire 67 leading from the other side of the solenoid to the wire 62 which connects with the other pole of the current source.

As further suggested in Figure 5, the supply pipe 8b for displacing fluid may involve appropriate equipment such as pressure reducing valve 68 and safety valve 69.

Figure 6 shows a system in which manual valve 3c for opening and closing the replenishing fluid pipe and shut-off valve 88 for opening and closing the displacing fluid pipe are each established in electrical controlling connection with the three-way valve 7c, so that each manual valve when operated will automatically establish that phase of the three-way connection which is appropriate to the function of the manual valve; and these electrical connections include upper and lower limit submerged terminals in such relation that if a manual valve is left open so long that the stage of the fluid which it admits to the tank exceeds a limit predetermined by the appropriate submerged terminal, the three-way valve will be automatically shifted to arrest the flow. To accomplish this, valve 3c for controlling the inlet of replenishing commodity through pipe 2c in the specific embodiment selected for illustrating the identifying principles of Figure 6, is a known form of valve controlled by hand lever 70 upon which is mounted a mercury switch 71 in position to open its controlled circuit when lever 70 is depressed to close valve 3c, and close its controlled circuit whenever lever 70 is raised to open valve 3c; and this mercury switch 71 is connected on one side to wire 72 leading from the positive wire 73 of an electric current source, and on the other side is connected by wire 74 to one of the lower limit submerged terminals 75 in tank 1, of which the other of said terminals is connected by wire 76, through relay magnet 77 and wire 78, to the negative wire 79 of the current source. Armature 80 of said relay is connected with positive wire 73 of said source, and when attracted by magnet 77 connects said positive wire with wire 81 that leads to the electric actuator 82, which is in turn connected by wire 83 with the negative wire 79 of the current source. Actuator 82 controls the pilot valve 84, the details of which appear in Figure 7, which is so connected that it can admit water under pressure from supply pipe 85 to a pipe 86 leading to pressure diaphragm 87 and thereby depress the three-way valve 7c, which is normally held by springs 87a in elevated position in which it admits displacing fluid from pipe 8c to pipe 5c. Thus, when the lever 70 of valve 3c is depressed, as shown in Figure 6, actuator 82 is deenergized and valve 7c assumes the position which leaves the apparatus ready for dispensing oil as needed. But the raising of lever 70 closes the circuit through mercury switch 71 and energizes actuator 82 so that pilot valve 84 is elevated from the position shown in Figure 7, water under pressure is admitted from pipe 85, three-way valve 7c is depressed to shut off flow from pipe 8c and open flow to waste pipe 6c, and replenishing fluid can flow freely from the pipe 2c. In thus energizing pilot valve actuator 82, submergence of lower limit terminals 75 in tank 1 by displacing fluid is an essential condition. Therefore, should the valve 3c be left open until such time that the common level between the replenished commodity and the displacing water descends below the terminals 75, the replenishing valve circuit will be automatically broken, actuator 82 deenergized, and pilot valve 84 will release the pressure on diaphragm 87 to the waste pipe 89 so that valve 7c will resume the position shown in Figure 6, and interrupt further escape of displacing fluid and consequently resist further inflow of the commodity before the latter can flow through the pipe 5c to sewer.

Similarly, valve 88, in the illustrative embodiment of the principle shown in Figure 6, is a valve controlled by lever 90 carrying a mercury switch 91, which is closed when valve 88 is opened, and which, in closing, establishes a circuit from positive wire 73 of the current source through wire 92 to said switch 91, and thence through wire 93 and upper limit submerged terminals 94 in the tank 1 to the wire 76 which, as has already been seen, connects through relay magnet 77 and wire 78 with the negative wire 79 of the current source. Thus, when valve 88 is opened to put the apparatus in condition for dispensing fluid, and fluid is dispensed until the common level between the commodity and the displacing fluids in tank 1 rises beyond the upper limit terminals 94 so that said terminals become submerged by the displacing fluid, relay 77 will be operated to close the circuit through the pilot valve actuator 82; said valve will be raised from the position shown in Figure 7 to admit pressure fluid from pipe 85 to pipe 86, three-way valve 7c will be depressed, and further ingress of displacing fluid, and therefore further discharge of commodity through the dispensing pipe 9c, will be prevented. The three-way valve will, however, at this time be in position to permit the replenishing valve 3c to function, since the phases of the pilot valve and its actuator, and the resultant phase of the threeway valve, are precisely those that will be established by raising the lever 70 to open the valve 3c (displacing liquid supply pipe 8c being closed and waste pipe 6c being open), and replenishment of supply in the tank 1 can proceed; nor will the inflow of replenishing fluid be arrested after it has entered and depressed the common level below the upper limit terminals 94, because while the circuit of valve lever 90 will be opened by submergence of upper terminals 94 in the non-conductive commodity, the circuit of lower limit terminals 75 will have been closed by raising valve lever 70, actuator 82 will be continued under energizing current, and refilling with commodity may proceed until the common level passes the lower submerged terminals 95 and opens the circuit of lever 70, whereupon the valve 7c will be again shifted, this time from its depressed position in which it permits waste of displacing fluid, to its elevated position in which it admits displacing fluid from the pipe 8c, and the apparatus is again ready for dispensing the commodity.

95 represents a signal, schematically shown as a signal light but which may be of any appropriate kind that will respond, directly or indirectly, to the flow of current in the circuits of the actuator 82. Whenever this signal is functioning, it indicates that the system is not in condition for dispensing commodity fluid. It will function when replenishing fluid is being admitted, but will cease to function when replenishment has been completed, for then the displacing liquid has fallen below lower limit terminals and the latter are submerged in non-conductive commodity fluid. These lower limit terminals are submerged by the conductive displacing fluid immediately the dispensing operation commences, but before starting the dispensing operation the replenishing valve should be closed, and thereby break the circuit at mercury switch 71. Should dispensing be undertaken without closing replenishing valve 3c (depressing handle 70) the displacing liquid which will immediately reach lower limit terminals 75 will, in conjunction with handle switch 71, energize actuator 82 and close three-way valve 7c against inflow of displacing fluid, which fact will be immediately announced by signal 95. But as soon as the oversight is discovered and valve 3c is closed, by depressing handle 70, switch 71 will open and deenergize actuator 82, three-way valve shifts to dispensing position, and dispensing may proceed. Similarly, when dispensing has proceeded to the point where supply of commodity has become exhausted from the tank, signal 95 will announce the fact because the relay circuit and consequently the circuit of actuator 82 will be closed by switch 91 and the now conductively submerged upper limit terminals 94, and the operator merely raises lever 70 of replenishing valve 3c and leaves it raised until signal 95 automatically ceases to function, when the tank will have been replenished.

In the system just described and as shown in Figure 6, it is not practical to bring about an unsafe functioning of the system by carelessly or improperly working the valves. If the replenishing valve 3c should be opened while dispensing is going on, the only result is to shut down the dispensing operation by changing the three-way valve to replenishing position. If current fails at the source 73, 79, or is not switched on when the replenishing valve 3c is opened, the three-way valve automatically remains in dispensing position and no inflow of the fluid commodity can occur.

In a system of the kind described, direct current or alternating current may be used for energizing the circuit or circuits which include submerged terminals. Collective control of the quantity of commodity fluid dispensed may be determined either by opening and closing of the delivery pipe, or opening and closing of the pipe through which displacing liquid enters the tank. Similarly, the inflow of replenishing supply of commodity can be regulated by opening and closing the inflow pipe, or by opening and closing the waste pipe for the displacing liquid. In the more convenient, and therefore preferred arrangement, the displacing liquid valve, both for opening and closing the supply of displacing liquid and opening and closing the waste pipe for displacing liquid, follow automatically the attainment of a predetermined position for the common level between the fluid and the level and also result from the manual opening and closing of the respective valves which admit replenishing supply of commodity or permit escape of commodity through the dispensing pipe.

While I have herein referred to the liquid which displaces the stored fluid as the "displacing liquid", it will be understood that when the waste valve is opened and the displacing liquid is allowed to flow out to sewer, the commodity fluid acts under the superior head under which it enters the tank to force out the displacing liquid into the waste pipe until the common level falls to the predetermined point of the lower limit terminals.

I claim:

1. In an apparatus of the class described, including a tank for containing a plurality of fluids which are non-mixing, an electric circuit having controlling means within said tank subjected to the influence of said fluids alternately according as the common level between the fluids is above or below said means, passages for the respective fluids communicating with said tank, valves controlling the respective passages, a valve actuator under the influence of said means within the tank arranged to control one of said valves, and means whereby said circuit is in turn controlled by the action of the other of said valves.

2. In an apparatus of the class described, including a tank for containing a plurality of fluids which are non-mixing, an electric circuit having controlling means within said tank subjected to the influence of said fluids alternately according as the common level between the fluids is above or below said means, passages for the respective fluids communicating with said tank, valves controlling the respective passages, a valve actuator under the influence of said means within the tank arranged to control one of said valves, means whereby said circuit is in turn controlled by the action of the other of said valves, and a fluid pressure means transmitting the actuating force between the valve actuator and the valve which it actuates.

3. In a storage system for fluids, a tank, means for delivering to and withdrawing from said tank the fluid to be stored, means for delivering to and permitting the escape from said tank of a displacing liquid, an electric circuit having closing and opening means in said tank in position to be influenced by said fluid and liquid, an electrical device in said circuit responsive to current flowing therethrough and a valve controlling the inflow of the stored fluid; said valve being controlled by said electrical device.

4. In a storage system for fluids, a storage tank, a stored fluid intake pipe, a voluntarily controlled valve governing the flow of fluid through said intake pipe, a pipe permitting the flow of displacing liquid from the tank in response to stored fluid entering the tank, a valve controlling such escape of the displacing liquid, an electrical device controlling the last-named valve, a circuit controlling said electrical device, and a switch in said circuit having a connection through which it is moved by the stored fluid intake valve.

5. In a storage system for fluids, a storage tank, a stored fluid intake pipe, a voluntarily controlled valve governing the flow of stored fluid through said intake pipe, a pipe permitting the flow of displacing liquid from the tank in response to stored fluid entering the tank, a valve controlling such escape of the displacing liquid, an electrical device controlling the last-named valve, a circuit controlling said electrical device, a switch in said circuit responsive to movements of the stored fluid intake valve, and circuit closing means also in said circuit located in the tank to cause its submergence by the stored fluid when said stored fluid reaches a predetermined low level in the tank.

6. In a storage system for fluids, a tank, a dispensing pipe through which to permit discharge of stored fluid from said tank, a displacing liquid pipe delivering displacing liquid into said tank for displacing stored fluid, an electrically controlled valve governing flow of displacing liquid through the displacing liquid pipe leading into the tank, a circuit through which said valve is controlled, a voluntarily controlled valve in the displacing liquid supply pipe, and a switch actuated by said voluntarily controlled valve which controls said electrically controlled valve.

7. A storage system for fluids as described in claim 6, in which there is also in said electric circuit a pair of terminals located within the tank in position to be submerged by displacing liquid when the latter attains a predetermined high level in said tank.

8. In an apparatus for dispensing fluid commodity, a tank, a fluid commodity passage and a displacing liquid passage both communicating with said tank, said displacing liquid passage having displacing liquid supply and waste pipes and a three-way valve opening communication between the tank and said pipes alternately, a shut-off means in said fluid commodity passage, an electrical actuator for said three-way valve controlled by said shut-off valve and caused to open the tank to the waste pipe when said shut-off pipe is open, and electric terminals located to be submerged in and exposed to contact with the fluid commodity and displacing liquid alternately as the relative quantities of said fluid and liquid vary in the tank; said terminals also controlling said electric actuator.

9. In a fluid containing and dispensing apparatus of the displacing liquid type, a tank, a fluid commodity passage and a displacing liquid passage both communicating with said tank, said displacing liquid passage being provided with a supply pipe and a waste pipe for displacing liquid, a three-way valve adapted to open said liquid passage to said supply pipe and said waste pipe alternately, an actuator for said three-way valve, a shut-off valve for the fluid commodity passage connected to control said actuator, and a shut-off valve in the displacing liquid supply pipe also connected to control said actuator.

10. An apparatus as described in claim 9, in which the fluid commodity shut-off valve when open causes the three-way valve to open the displacing liquid passage to the waste pipe, and the displacing liquid shut off valve when open influences said actuator to cause the three-way valve to open the tank to the displacing fluid supply pipe.

11. An apparatus as described in claim 9, in which the three-way valve actuator is electrically operated, the shut-off valves are in electrical connection therewith, and there are in the tank a pair of lower limit terminals which control the circuit through which the commodity fluid shut-off valve influences the actuator, and a pair of upper limit terminals controlling the circuit through which the displacing liquid shut-off valve influences the actuator.

Signed at Chicago, Illinois, this 26th day of February, 1929.

WM. J. WIGNALL.